United States Patent [19]
Hayashi et al.

[11] Patent Number: 5,715,447
[45] Date of Patent: Feb. 3, 1998

[54] METHOD OF AND AN APPARATUS FOR SHORTENING A LOCK PERIOD OF A SHARED BUFFER

[75] Inventors: Katzumi Hayashi; Masaaki Mitani; Yoshinori Shimogai, all of Kawasaki, Japan

[73] Assignee: Fujitsu Limited, Kawasaki, Japan

[21] Appl. No.: 562,633

[22] Filed: Nov. 27, 1995

Related U.S. Application Data

[63] Continuation of Ser. No. 419,055, Apr. 7, 1995, abandoned, which is a continuation of Ser. No. 39,065, filed as PCT/JP92/00996 Aug. 5, 1992 published as WO93/03436 Feb. 18, 1993, abandoned.

[30] Foreign Application Priority Data

Aug. 6, 1991 [JP] Japan ................................. 3-196497

[51] Int. Cl.[6] ........................................................ G06F 17/30
[52] U.S. Cl. ............................................................. 395/608
[58] Field of Search ....................................... 395/608, 601

[56] References Cited

U.S. PATENT DOCUMENTS

| | | | |
|---|---|---|---|
| 5,163,148 | 11/1992 | Walls | 395/600 |
| 5,317,731 | 5/1994 | Dias et al. | 395/600 |
| 5,386,554 | 1/1995 | Nozaki | 395/600 |

FOREIGN PATENT DOCUMENTS

| | | |
|---|---|---|
| 62-245347 | 10/1987 | Japan . |
| 62-245348 | 10/1987 | Japan . |
| 63-133240 | 6/1988 | Japan . |
| 64-68850 | 3/1989 | Japan . |
| 3-3046 | 1/1991 | Japan . |
| 4-18646 | 1/1992 | Japan . |
| 4-24750 | 1/1992 | Japan . |

OTHER PUBLICATIONS

Kooth et al "Database System Concepts 2/e" McGraw-Hill pp. 365–374, 1991, 1986.

Date, C.J., *An Introduction to Database Systems*, vol. II, Jul. 1985, Addison–Wesley, Reading, MA, pp. 9–17.

*IBM Technical Disclosure Bulletin*, vol. 29, No. 5, Oct. 1986, New York, NY, "Update Merging Mechanism for Shared Memory in Multi–Systems," pp. 2328–2331.

*IBM Technical Disclosure Bulletin*, vol. 33, No. 3B, Aug. 1990, New York, NY, "Weak Locks with Two–Level Locking Multi–Computer System Protocol to Reduce Lock–Holding Time," pp. 287–288.

Mohan, C., "Recovery and Coherency–Control Protocols for Fast Intersystem Page Transfer and Fine–Granularity Locking in a Share Disks Transaction Environment," *IBM Research Report*, RJ 8017, Mar. 15, 1991, Yorktown Heights, NY, pp. 1–31.

*Primary Examiner*—Thomas G. Black
*Assistant Examiner*—Jack M. Choules
*Attorney, Agent, or Firm*—Staas & Halsey

[57] ABSTRACT

A method of shortening a lock period of a shared buffer in a data processing system includes a step of securing a copy memory used when nonvolatilizing the contents of the shared buffer, a step of temporarily locking the shared buffer, a step of copying the contents of the shared buffer into the copy memory, a step of unlocking the shared buffer after the completion of the copying step and a step of nonvolatilizing the contents of the copy memory. The shared buffer is locked before the contents thereof are copied into the copy memory and is unlocked after the completion of the copying step and before the nonvolatilization of the contents of the copy memory.

8 Claims, 8 Drawing Sheets

METHOD OF AND AN APPARATUS FOR SHORTENING A LOCK PERIOD OF A SHARED BUFFER

This application is a continuation, of application Ser. No. 08/419,055, filed Apr. 7, 1995, now abandoned, which is a continuation of application Ser. No. 08/039,065, filed as PCT/JP92/00996 Aug. 5, 1992, published as WO93/03436 Feb. 18, 1993 now abandoned.

FIELD OF THE INVENTION

The present invention relates to a method for and an apparatus for shortening a lock period of a shared buffer, and particularly, to a method for and an apparatus for shortening a lock period of a shared buffer that interposes when application programs query a data base management system to access a database. Shortening the lock period during which the contents to the buffer shared by transactions are written back to the database shortens a waiting time of the transactions.

DESCRIPTION OF THE RELATED ART

Many data processing systems working on computers employ a database. The database is a file containing various data shared by users and is controlled by a database management system which is software controlled. Application programs running on a computer create transactions to query the database management system to refer to or update the database. Each transaction serves as an execution unit to refer to, retrieve data from, or update the database.

When a transaction accesses the database for some data through the database management system, the data may already be in a buffer shared by transactions due to another transaction that previously accessed the same data, or the data must be transferred from the database to the shared buffer. The transaction in question then refers to or updates the contents of the shared buffer through the database management system. In this way, data of the database are stored in a disk as well as in at least one buffer shared by transactions. When some data is continuously used for a long time by transactions, the data will always be present in the shared buffer.

The shared buffer is allocated in a volatile memory that operates at high speed. If a system crash occurs before a result of a transaction acting on the shared buffer is written back to the database on the disk, the contents of the shared buffer will be lost.

To avoid such loss, the contents of the shared buffer must be stored as a post-update log in a nonvolatile memory. According to the post-update log and data on the disk, the last contents of the shared buffer will be recovered if they are lost. The time required for the recovery is proportional to the volume of the post-update log. The recovery time will be shortened if the volume of the post-update log is made smaller. To reduce the volume of the post-update log, the contents of the shared buffer must be periodically written back to the database on the disk. A period for writing the contents of the shared buffer back to the database on the disk is a lock period of the shared buffer.

During the lock period of the buffer shared by transactions, the transactions are queued.

The present invention relates to a method of and an apparatus for shortening such lock period of a shared buffer to a memory copying period.

SUMMARY OF THE INVENTION

A method for shortening a lock period of a shared buffer in a data processing system according to an aspect of the present invention involves a step of securing a copy memory used when nonvolatilizing the contents of the shared buffer, a step of temporarily locking the shared buffer, a step of copying the contents of the shared buffer into the copy memory, a step of unlocking the shared buffer after the completion of the copying step, and a step of nonvolatilizing the contents of the copy memory.

This present invention provides that the shared buffer is locked before the contents thereof are copied into the copy memory and is unlocked after the completion of the copying and before the nonvolatilization of the contents of the copy memory.

The method described above further includes a step of determining whether or not the shared buffer to be nonvolatilized will be updated. If the shared buffer will not be updated, the contents of the shared buffer are written back to and nonvolatilized in a database without securing the copy memory and without copying the contents of the shared buffer into the copy memory.

A data processing system according to another aspect of the present invention includes, but is not limited to, a database management system for accessing and managing a database, at least one buffer shared by transactions, a log buffer for temporarily storing pre-update and post-update logs, a log file for storing the pre-update and post-update logs, and the database for storing data.

The database processing system further includes a copy memory for temporarily storing the contents of the shared buffer.

The data processing system further includes a replacement controller for copying the contents of the shared buffer into the copy memory, a process selector for determining whether or not the shared buffer will be updated, an exclusive controller for exclusively controlling the shared buffer, and a log controller for saving the pre-update and post-update logs.

This present invention provides that the shared buffer is locked before the contents thereof are copied into the copy memory and is unlocked after the completion of the copying and before the nonvolatilization of the contents of the copy memory, to thereby shorten a lock period of the shared buffer.

If the shared buffer will not be updated, the process selector writes the contents of the shared buffer to and nonvolatilizes them in the database without securing the copy memory and without copying the contents of the shared buffer into the copy memory.

DETAILED DESCRIPTION OF THE PREFERRED EMBODIMENT

Before explaining an embodiment to the present invention, the prior art and the problems thereof will be explained.

Figure 1:
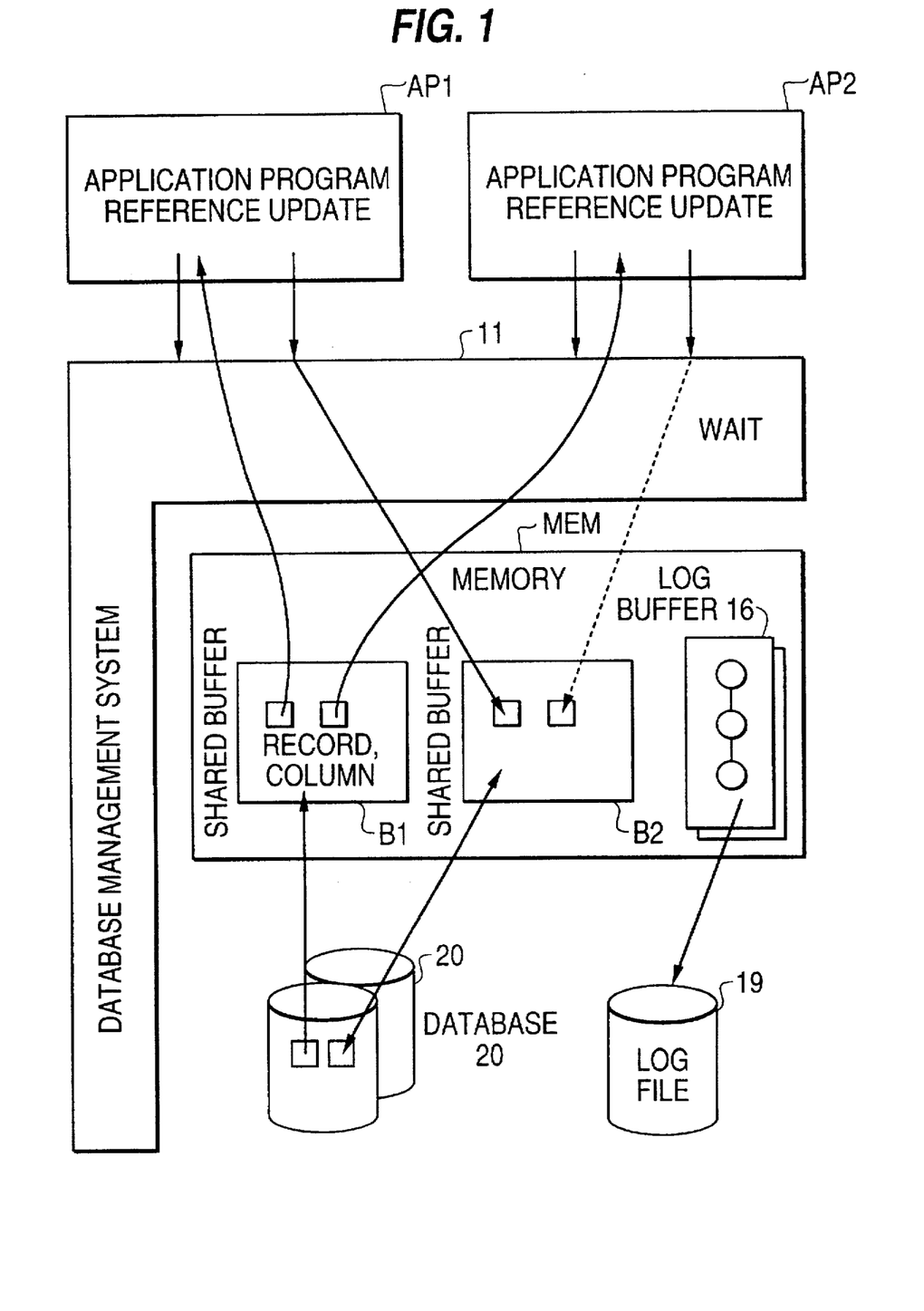
FIG. 1 illustrates the control of shared buffers according to the prior art.

Referring now to FIG. 1 illustrates the control of shared buffers according to the prior art. Application programs AP1 and AP2 create transactions to refer to and update a database 20. A database management system 11 is configured as software for accessing and managing database 20. A memory MEM is disposed in a data processing system. Buffers B1 and B2 are shared by the transactions. A log buffer 16 stores pre-update and post-update logs. A log file 19 stores the contents of the log buffer 16.

The application program AP1 retrieves data from database 20 through the database management system 11. The application program AP2 retrieves data from the database 20 through database management system 11 and updates the data.

When application program AP1 provides database management system 11 with an instruction to retrieve data (e.g., such as a record or a column), database management system 11 transfers the required data from the shared buffer B1 to the application program AP1 if the buffer B1 holds a page (e.g., a block) containing the required data. If the buffer B1 does not have the page, database management system 11 fetches the page from the database 20, puts that page in the buffer B1, and transfers the required data from the buffer B1 to application program AP1.

When application program AP2 provides database management system 11 with an instruction to fetch data from the same page as that requested by application program AP1, database management system 11 transfers the required data, which has already been transferred from database 20 to shared buffer B1, from the buffer B1 to the application program AP2 without repeatedly retrieving the data from the database 20.

With the structure described above, a page number is frequently used as a key to lock a corresponding page in a buffer shared by transactions. The locked page allows the transactions to simultaneously refer to data stored therein but prohibits the transactions from simultaneously updating that page. For example, if application program AP2 provides an instruction to update a page in the shared buffer B2 while the same page is being updated and locked according to a page number provided by application program AP1, a transaction caused by the updating instruction of the application program AP2 must wait until the page is again and later unlocked.

When the transaction of application program AP1 reaches a commit or execution enable point, database management system 11 unlocks that page. Thereafter, the page in the shared buffer B2 is again and later locked by the updating transaction of application program AP2 and is thereafter updated. Accordingly, the buffer shared by application programs AP1 and AP2 is updated.

The shared buffer may be locked in a fashion so that it is locked sub-page by sub-page, or record by record, instead of pages by page. In this case, application programs AP1 and AP2 may simultaneously update the sub-pages or records in the shared buffer.

The contents (i.e., pages) of the shared buffer are written back to the disk (i.e., data base 20) at a predetermined timing. Then, a log holding data updated by the last read or write operation will not be needed for recovering the contents of the buffer even if they are lost. The log buffer 16 temporarily stores pre-update and post-update logs of the shared buffers B1 and B2. The contents of the log buffer 16 are nonvolatilized by saving them in the log file 19 at a predetermined timing.

Figure 2:
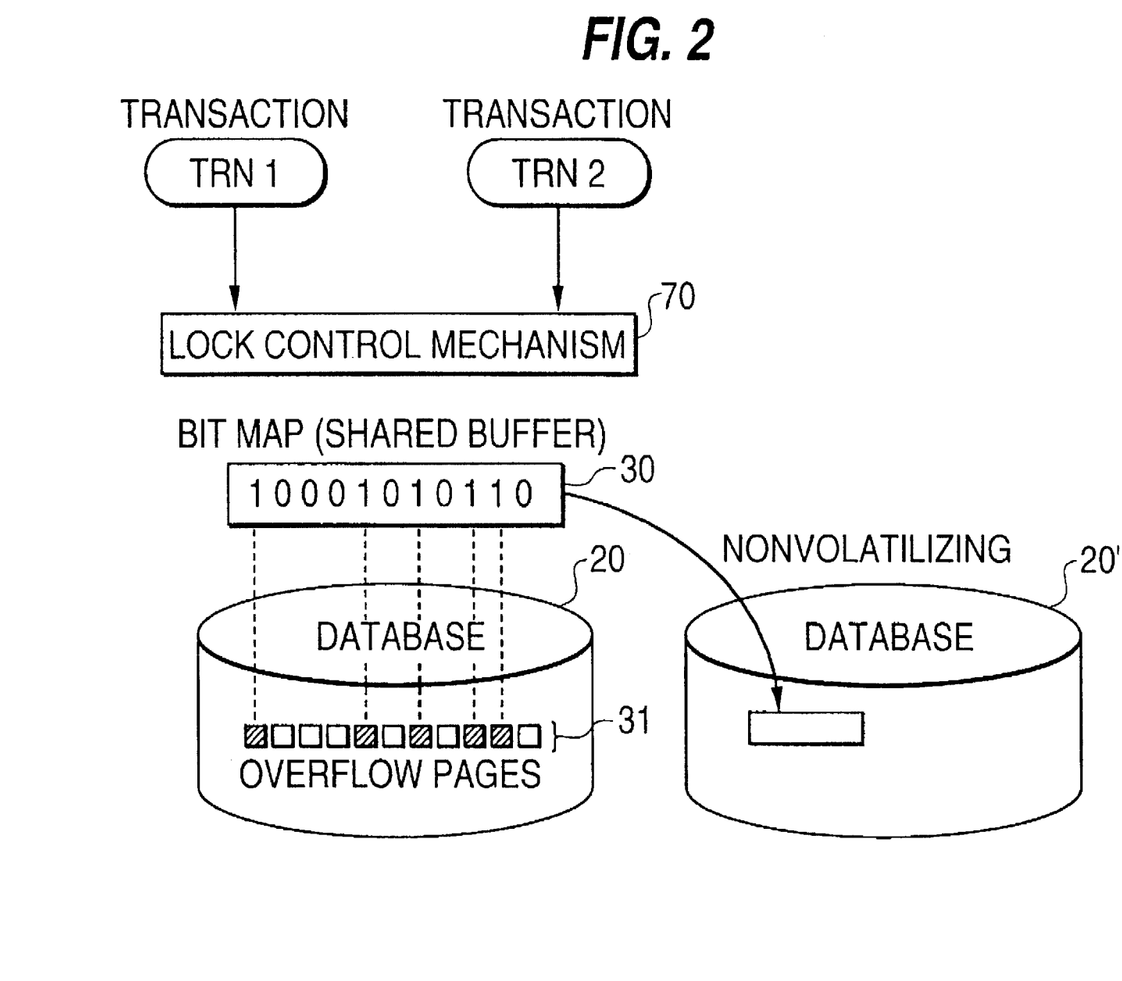
FIG. 2 illustrates the writing of buffered data to a database according to the prior

FIG. 2 illustrates a write back operation according to the prior art. There are two transactions TRN1 and TRN2. Database management system 11 has a lock controller 70. A buffer shared by the transactions is a bit map 30. The database 20 includes overflow pages 31. A database 20' is used to nonvolatilize the contents of the shared buffer. The bit map 30 controls overflow pages 31. For example, any bit of the bit map 30 will be ON when a corresponding one of the overflow pages 31 is in use and OFF when the corresponding page is unused. The bit map 30 is updated by a transaction using or not using the overflow pages 31.

Whenever a bit of the bit map 30 is updated, a log of the bit map is accumulated in a log file or in a nonvolatile memory. If a system crash occurs, the bit map 30 is recovered according to post-update logs. The quantity of the logs must be as small as possible to reduce the cost of a recovering system. To reduce the quantity of the post-update logs used for recovering the shared buffer after the contents thereof are lost, the bit map 30 is saved in the database 20' that may be realized in a disk.

The bit map that manages the overflow pages is frequently accessed by transactions, and therefore, is called a "hot spot". Once the bit map is read from the database into the shared buffer, it will be continuously accessed and will never be written back to the disk (database 20') unless it is forcibly or expressly saved in the database 20'. To reduce the quantity of the post-update logs necessary for recovering the bit map and to reduce the cost of the recovering system, the bit map in the shared buffer must be forcibly or expressly saved in the database 20'.

Figure 3:
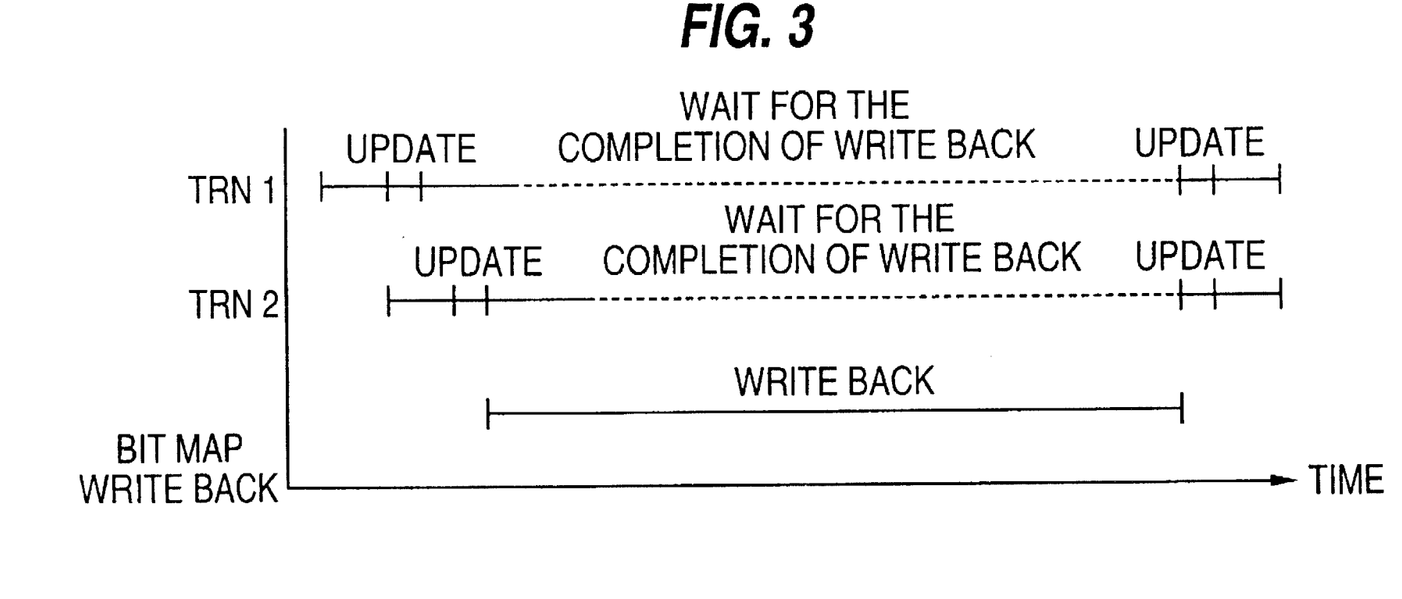
FIG. 3 illustrates temporal changes in transactions according to the prior art.

FIG. 3 illustrates temporal changes in the transactions according to the prior art described above. When the bit map 30 of FIG. 2 is forcibly or expressly written back to the database 20', the transactions TRN1 and TRN2 that are going to obtain the overflow pages 31 are queued until the bit map 30 is completely written back to the database 20'. Namely, once the write back operation of the bit map 30 starts, the update demands of the transaction TRN1 and TRN2 are queued until the write back operation ends.

If a transaction updates the hot spot such as the bit map 30 of the shared buffer while the contents of the buffer are being forcibly written back to the database, data in the middle of updating will be saved in the database. To recover the contents of the shared buffer lost due to a system crash, it is necessary to employ a special logging system employing a restricted structure and independent characteristics. Such logging systems may substitute old logs for lost logs.

The present invention, however, is based on a standard logging system that does not allow a loss of pre-update and post-update logs. The present invention, therefore, separately carries out the write back of the contents of a shared buffer and the saving of a log of the buffer. Namely, the present invention saves all logs of a shared buffer before starting a write back operation and stops transactions that update the shared buffer, during the write back operation.

As explained before, transactions that update a shared buffer must be put in a wait state while the contents of the buffer are being written back to a database. This results in elongating a response time of the transactions. A response time of a transaction is a sum of an original response time of the transaction, a write back time of a shared buffer, and a write time of a pre-update log. Namely, when the contents of a shared buffer that is going to be updated by a transaction are written back to a database, a response time of the transaction is a sum of an original response time of the transaction, a time necessary for writing back the contents of the buffer to the database, and a time necessary for saving a pre-update log of the buffer that has been updated by a presently active transaction, in a log file.

A transaction that is in a wait state due to a locked hot spot in a shared buffer may involve resources other than the shared buffer. Namely, the transaction may involve other pages of a database and memories in addition to the hot spot that is being forcibly or expressly written back to the database. Accordingly, while the transaction is in the wait state, other transactions will be queued behind the transaction in question until the resources related to the transaction in question are released. The queued transaction are unable to use any resource. Even a system having a capacity of MIPS (i.e., multiple million instructions per second) grade is unable to use any resource until the first wait state is cancelled. This situation resembles a traffic jam and is called a "convoy phenomenon". Other conventional techniques for controlling database buffers include a shadow paging method and a multiversion concurrency control method. These methods may resemble the present invention in that they copy the contents of a shared buffer. These methods, however, essentially differ from the present invention as will be explained below.

The shadow paging method locks a shared buffer page by page, and when a transaction updates a given page, the method allows no other transactions to share the locked page. Before the updating transaction reaches a commit point, the contents of the page in the middle of updating are written back to an unused page allotted in a disk (i.e., a database). The database contains page data and a table showing relationships between page numbers and locations on the disk. When the contents of the updated page are completely written back to the allotted page on the disk, an original page is shifted to the allotted page in the table, and then a commitment is given to the transaction. A rollback is achieved by simply discarding the allotted page. This shadow paging method resembles the present invention in that it allots an area for storing write back data. This method, however, allots the area on the disk, prohibits the sharing of a page that is being updated, and never considers an improvement in write back performance.

The multiversion concurrency control method will now be explained. This method does not guarantee a sequence of steps. An updating transaction has an exclusive copy of data to be updated and puts other transactions in a wait state until it reaches a commit point. Transactions are allowed to simultaneously refer to a committed latest copy. Whenever an updating transaction reaches a commit point, a new version will now be described. No "dirty" copy exits in the middle of a transaction. Order of commitment and reference may be restricted to achieve various levels of integrities. This method resembles the present invention in that it makes a copy of a shared buffer. This method, however, never solves the problems related to the forcible or express write back operations. The present invention is effective for the multiversion method and a conventional strict exclusive control method.

An object of the present invention is to provide a method of and apparatus for shortening a lock period during which other transactions are queued and in which the contents of a buffer shared by the transactions are written back to a database.

The present invention improves a response time of a transaction that updates a buffer. When it is predicted that there will be no transaction that updates the buffer, the present invention omits the temporary copying of the contents of the buffer, to improve the response time. This results in further improving a system throughput than a standard case that carries out the temporary copying operation.

Figure 4:
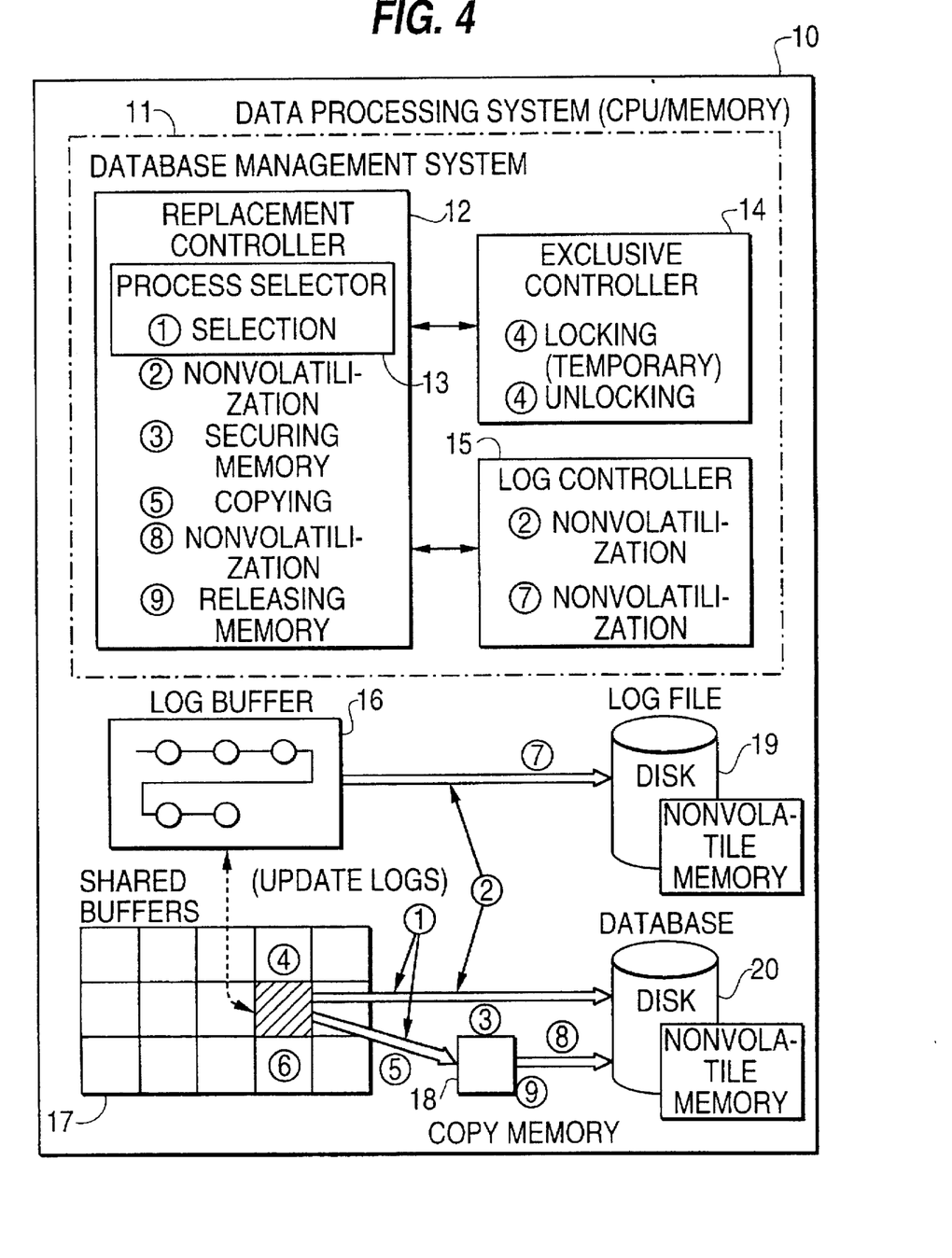
FIG. 4 illustrates preferred embodiment of the present invention.

FIG. 4 illustrates a basic arrangement of the present invention. This arrangement includes a data processing system 10 having a CPU and memories. A database management system 11 is configured as software for accessing and managing a database. The database management system 11 has a replacement controller 12 for copying the contents of an object buffer to shorten a lock period of the buffer, a process selector 13 for determining whether or not the buffer will be updated, an exclusive controller 14 for controlling the buffer and a log control 15 for saving pre-update and post-update logs. A log buffer 16 stores the pre-update and post-update logs. A group of buffers 17 are shared by transactions. A copy memory 18 temporarily stores the contents of one of the shared buffers 17. A log file 19 is realized in a disk or in a nonvolatile memory. The database 20 is realized in a disk or in a nonvolatile memory.

According to the present invention, the buffers 17 are not limited to those mentioned below but may be of any kind. These buffers are shared by a plurality of transactions and stored data to be nonvolatilized.

A method of shortening a lock period of any one of the shared buffers according to the present invention include a step (3) of securing the copy memory 18 used when non-volatilizing the contents of an object one of the shared buffers 17, a step (4) of temporarily locking the object buffer, a step (5) of copying the contents of the object buffer into the copy memory 18, a step (6) of unlocking the object buffer after the completion of the copying, and a step (8) of writing back (i.e., nonvolatilizing) the contents of the copy memory.

The above-listed method is such that the object buffer is locked before the contents thereof are copied into the copy memory and is unlocked after the completion of the copying and before the write back (nonvolatilization) of the contents of the copy memory.

Moreover, the method also has a step of predicting whether or not the object buffer to be nonvolatilized will be updated (i.e., whether or not any transaction updates a part in a database corresponding to the object buffer). If the object buffer will not be updated, the contents of the object buffer are written back to and nonvolatilized in the database without securing the copy memory and without copying the contents of the object buffer into the copy memory.

The method listed in the above steps are managed by the database management system 11. Each of the steps will be explained in detail below. When the contents of an object one of the shared buffers 17 are nonvolatilized by writing them back to the database 20, the replacement controller 12 secures the copy memory 18. The copy memory 18 must have the same size as the object buffer 17 depicted as a hatched area in FIG. 4. The replacement controller 12 asks the exclusive controller 14 to lock the object buffer 17. The locking serializes a period in which a transaction completely updates the object buffer and a period in which the contents of the object buffer are nonvolatilized and in which necessary communication is carried out.

Locking is not a transaction lock but is to prevent a simultaneous execution of a buffer control function of an access module for accessing the database and a write back function of the contents of the object buffer to the disk (i.e., database). On the other hand, the transaction lock is a transaction granule lock that directly guarantees the ACID characteristics of a transaction. For example, the transaction lock employs a logical page or record number as a key to lock a corresponding page or record in a database. In particular, before referring to or updating the contents of a given page or record of a database, a transaction locks the contents of the page or record according to a logical number of the page or record is unlocked after the transaction reaches a commit or execute point.

After the exclusive controller 14 locks the object buffer 17, the contents of the buffer are copied into the copy memory 18. Thereafter, the exclusive controller 14 unlocks the object buffer 17.

Pre-update and post-update logs are thereafter nonvolatilized if necessary. The contents of the copy memory 18 are written to and nonvolatilized in the database 20. The copy memory 18 is then released.

As explained above, the present invention predicts whether or not the object buffer will be updated (i.e., whether or not any transaction updates a part of the database corresponding to the object buffer). For example, the object buffer will never be updated during a batch retrieval operation or during a wide-range shared lock. If it is predicted that the object buffer will not be updated, the contents of the object buffer are written back to and nonvolatilized in the database without securing the copy memory and without copying the contents of the buffer into the copy memory.

The prediction process now will be explained in detail. In FIG. 4, the replacement controller 12 has the process selector 13. The process selector 13 predicts whether or not an object of the shared buffers 17 will be updated. This prediction is realized with use of the exclusive control of a transaction lock. In particular, the prediction is carried out by seeing whether or not the object buffer 17 is locked against a transaction under or in unshared mode, or by seeing whether or not there is a lock demand of an unshared mode.

If it is predicted that the object buffer will be updated, the copy memory 18 is secured, the object buffer is temporarily locked, and the contents of the object buffer are copied into the copy memory. If it is predicted that the object buffer will not be updated, the contents of the object buffer are nonvolatilized without securing the copy memory 18 and without copying the contents of the object buffer into the copy memory.

In FIG. 4, reference numerals (1) to (9) indicate steps carried out in the data processing system. Each of the steps now will be explained. Numerals used in the following explanation correspond to the step numbers shown in the figure.

(1) A hatched one of the shared buffers 17 is going to be nonvolatilized. The process selector 13 in the replacement controller 12 predicts whether or not the object buffer 17 will be updated. If it will not be updated, step (2) is executed, and if it will be updated, step (3) is executed. As indicated in the lower part of FIG. 4, step (1) is optional. In particular, the contents of the object buffer may always be nonvolatilized through the copy memory 18 without the update prediction. Alternatively, the contents of the object buffer may be nonvolatilized according to a result of the update prediction.

(2) The exclusive controller 14 temporarily locks the object buffer 17. The log controller 15 writes a pre-update log to the file 19 through the log buffer 16. The log buffer 16 is a nonvolatile memory for storing pre-update and post-update logs. The contents of the object buffer 17 are written to and nonvolatilized in the database 20. The exclusive controller 14 unlocks the object buffer 17 to complete the process.

(3) If it is determined that the object buffer 17 will be updated, the copy memory 18 is secured. The size of the copy memory 18 must be equal to or larger than that of the object buffer 17 (i.e., the hatched area in FIG. 4).

(4) The exclusive controller 14 locks the object buffer 17. (5) The contents of the object buffer 17 are copied into the copy memory 18. (6) After the copying, the exclusive controller 14 unlocks the object buffer 17. (7) The pre-update log in the log buffer 16 is stored in the log file 19 and nonvolatilized.

(8) The contents of the copy memory 18 are written to the database 20 and are nonvolatilized.

(9) The secured area of the copy memory 18 is released after the completion of the nonvolatilization.

According to the above-described processes, step (4) locks the object buffer 17, and (5) copies the contents of the object buffer 17 (i.e., the hatched area) into the copy memory 18. Just after the completion of the copying, step (6) unlocks the object buffer 17. Accordingly, the lock period of the object buffer 17 is very short, thereby improving a response time of a transaction that is going to update the object buffer 17. As explained before, a response time of a transaction is a sum of an original response time of the transaction, a time for writing back the contents of a shared buffer to a database, and a time for writing a pre-update log of the transaction that has updated the buffer in question and is now being executed, to the log file 19. The present invention eliminates the time for writing the contents of the object buffer to the database from the response time.

In step (1), the process selector 13 predicts whether or not the object buffer 17 will be updated. If the buffer will not be updated, the step (2) nonvolatilizes the contents of the object buffer without using the copy memory 18. This eliminates securing the copy memory that will not be used, thereby improving the throughput of the system compared with a normal case that employs the copy memory.

The nonvolatilization of the pre-update log in steps (2) and (7) is not necessarily needed. The cases of needing and not needing the nonvolatilization of the pre-update log will be explained. In some cases, a post-update log must be nonvolatilized too. The explanation below relates only to operations occurring when saving the contents of an object buffer into the database. The necessity and unnecessariness of the logs in other cases will not be explained. If there is a transaction that is updating an object buffer 17 to be non-volatilized and if there is a pre-update log, the pre-update log must be nonvolatilized. If a transaction that updated the object buffer 17 has already reached a commit or execute point, or if an overflow page is newly allotted to receive data for the first time and data has been established in the object buffer 17 regardless of an original page in the disk (i.e., the database 20), the pre-update log is not required to be nonvolatilized.

Figure 5:
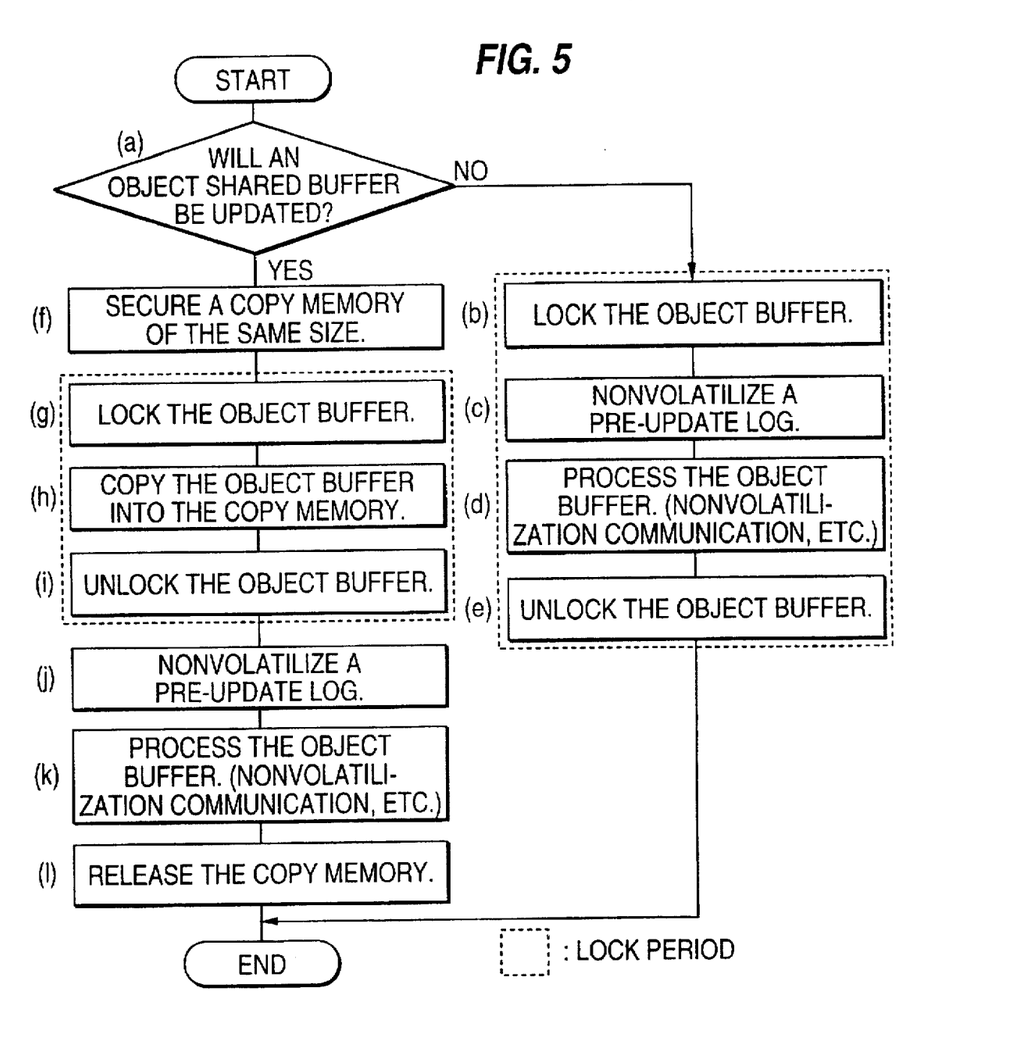
FIG. 5 is a flow chart which shows a flow of processes according to the embodiment of the present invention depicted in FIG. 4.

Referring now to FIG. 5 illustrated therein is a flow chart of the steps according to an embodiment of the present invention. Each of the steps shown in the Figure will be explained. An area enclosed with a dotted line corresponds to a lock period.

(a) The process selector 13 predicts whether or not an object one of the shared buffers 17 to be nonvolatilized will be updated. If it will not be updated, step (b) is executed, and if it will be updated, step (f) is executed. The step (a) may be omitted, so that the copy memory 18 is always secured whenever the contents of an object buffer are nonvolatilized without predicting the probability of updating.

(b) The exclusive controller 14 temporarily locks the object buffer 17. This step temporarily serializes a period for actually updating the contents of the object buffer 17 and a period for copying the same into the copy memory before writing back the same to the database.

(c) The log controller 15 stores a pre-update log of the object buffer in the log file 19 through the log buffer 16.

(d) The contents of the object buffer are nonvolatilized, and necessary communication is carried out.

(e) The exclusive controller 14 unlocks the object buffer. This completes the flow of operation.

(f) If it is predicted that the object buffer will be updated, the copy memory 18 is secured. The size of the copy memory 18 must be the same as the size of the object buffer.

(g) The exclusive controller 14 locks the object buffer to temporarily prohibit transactions from accessing the object buffer.

(h) The contents of the object buffer (i.e., the hatched area in FIG. 4) are copied into the copy memory 18.

(i) Just after the completion of the copying, the exclusive controller 14 unlocks the object buffer 17.

(j) A pre-update log stored in the buffer 16 is stored in the log file 19 and nonvolatilized.

(k) The contents of the object buffer are nonvolatilized, and necessary communication is carried out.

(l) After the completion of the nonvolatilization of the contents of the copy memory 18, the copy memory 18 is released.

According to the processes listed and describe above, step (a) determines whether or not the object buffer will be updated according to the exclusive control data (i.e., the locking of the object buffer against transactions). In particular, this determination is done by seeing whether or not the determination is done by seeing whether or not the object buffer 17 involving an object page is locked against transactions which are in an unshared mode, or by seeing whether or not there is a lock demand of unshared mode. If the object buffer is locked or demanded to be locked under a shared mode, it is determined that the object buffer will not be updated. If the object buffer is locked or demanded to be locked under an unshared mode, it is determined that the object buffer will be updated.

For example, if one or a plurality of transactions are locking a given page under a shared mode, it will be predicted that no transaction will wait for updating the page while the page is being locked and directly written back to a database. On the other hand, if a transaction locks a given page under an unshared mode, it will be predicted that there will be some transactions waiting for updating the page while the page is being locked and directly written back the database. In this fashion, the probability of updating is determined.

Figure 6:
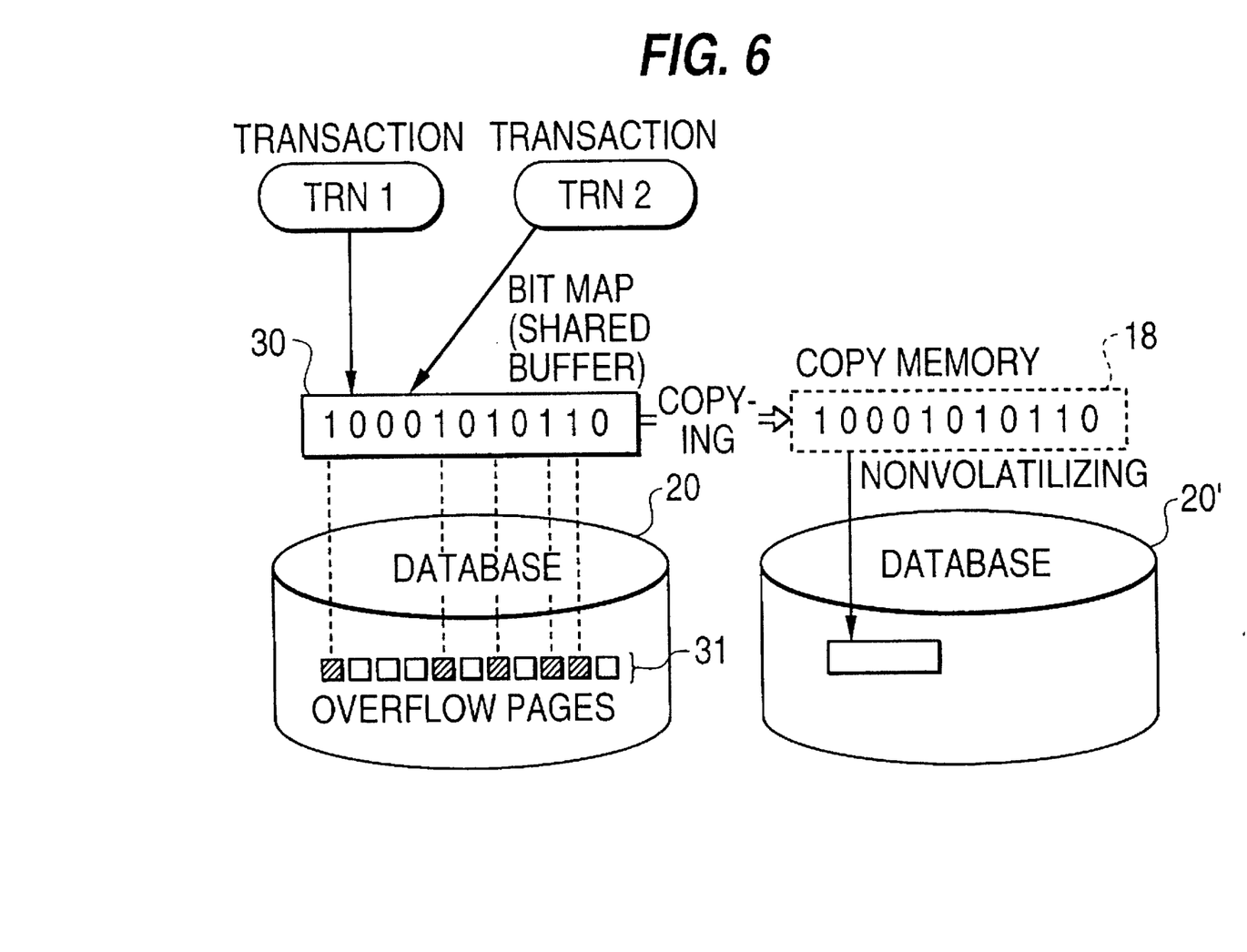
FIG. 6 illustrates the writing of buffered data to a database according to the embodiment depicted in FIG. 4.

Referring now to FIG. 6 therein depicted is a data write back to a database operation, according to an embodiment of the present invention. Similar to FIG. 2, this embodiment includes transactions TRN1 and TRN2, a bit map 30, databases 20 and 20', a copy memory 18, and overflow pages 31. The bit map is realized in a shared buffer and is copied into the copy memory 18.

If a shared buffer is more frequently updated than other shared buffers, the contents thereof will not be written back to the database. Namely, updated contents of the buffer are always held in a memory without being saved in the database. Such a busy buffer is called a "hot spot".

As explained with reference to FIG. 2, the bit map 30 controlling the overflow pages 31 easily becomes a hot spot, because the bit map 30 is accessed page by page and the data density of the bit map 30 is thick. In this case, the contents of the buffer must be forcibly or expressly written back to the database, or a large quantity of post-update logs must be prepared for recovery. The present invention minimizes the influence of the locking of the buffer by securing the copy memory 18 in a standard database management system.

After the completion of the copying, the bit map 30 is unlocked, and therefore, the transaction TRN1 and TRN2, which may lock the bit map 30 bit by bit, can use the bit map 30. In particular, the transactions TRN1 and TRN2 are put in a wait state only for the period during which the bit map 30 is copied into the copy memory 18. This technique remarkably shortens the lock period compared with the prior art mentioned above. In practice, the technique can reduce the lock period to about 1/10000 to 1/100000 of the prior art, thereby drastically improving a response time of a transaction, eliminating the convoy phenomenon, and increasing throughout.

Figure 7:
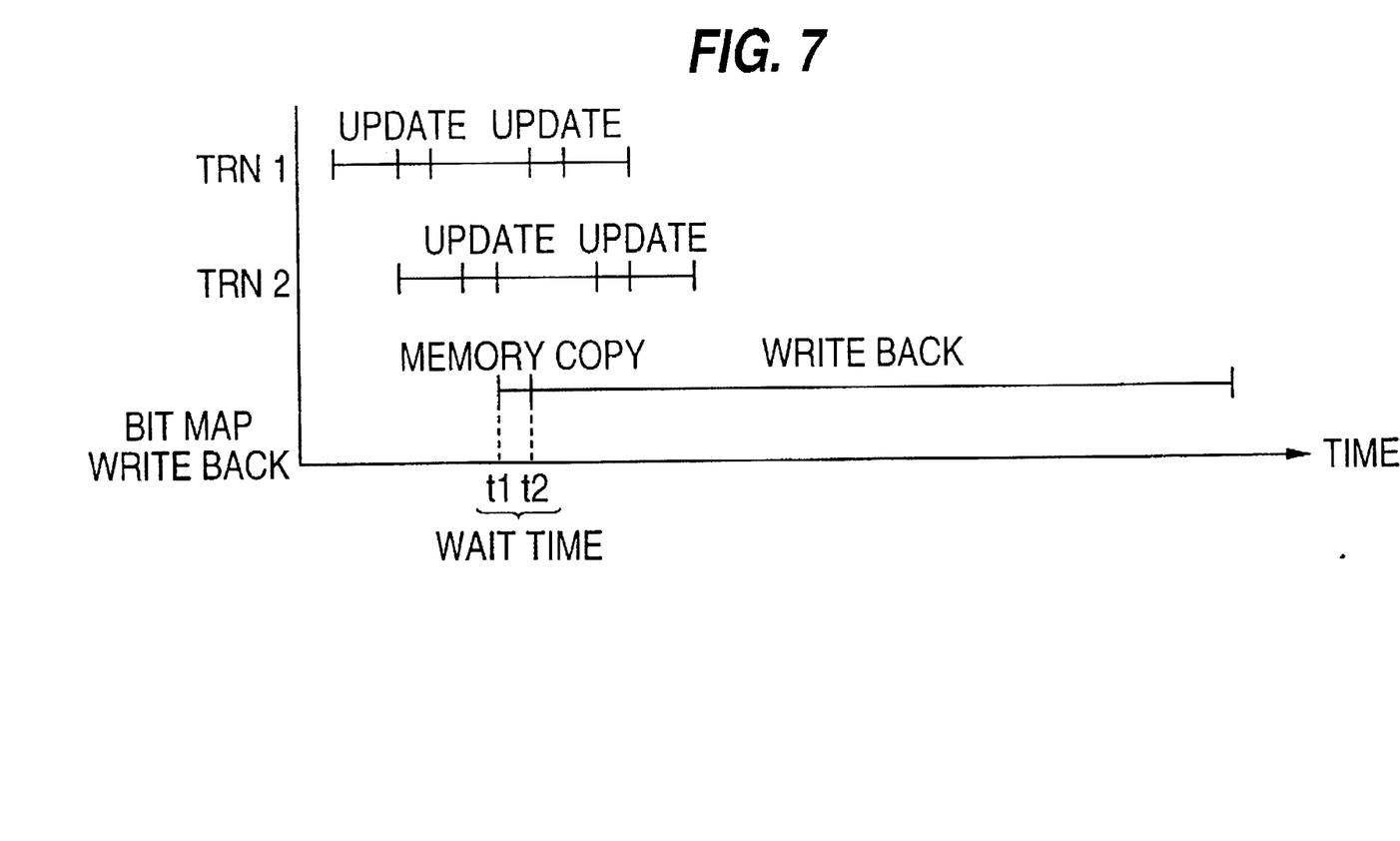
FIG. 7 illustrates temporal changes in transactions according to the embodiment depicted in FIG. 4.

Referring now to FIG. 7, therein depicted are temporal changes in transactions according to the first embodiment of the present invention. An abscissa represents time, and segments represent the transactions. According to the prior art, the transactions TRN1 and TRN2 for updating the bit map 30 are put in a wait state while the bit map 30 is being written back to the database 20'.

According to the embodiment of the present invention, the transactions TRN1 and TRN2 are independent of the write back operation of the bit map 30 to the database 20'. The transactions TRN1 and TRN2 are put in a wait state only for a period between t1 and t2 in which the bit map 30 is copied into the copy memory 18 before being saved in the database 20'.

The period of copying the bit map 30 into the copy memory 18 is very short compared with the period of writing back the bit map 30 to the database 20'. Accordingly, the lock period between t1 and t2 is very short.

Figure 8A:
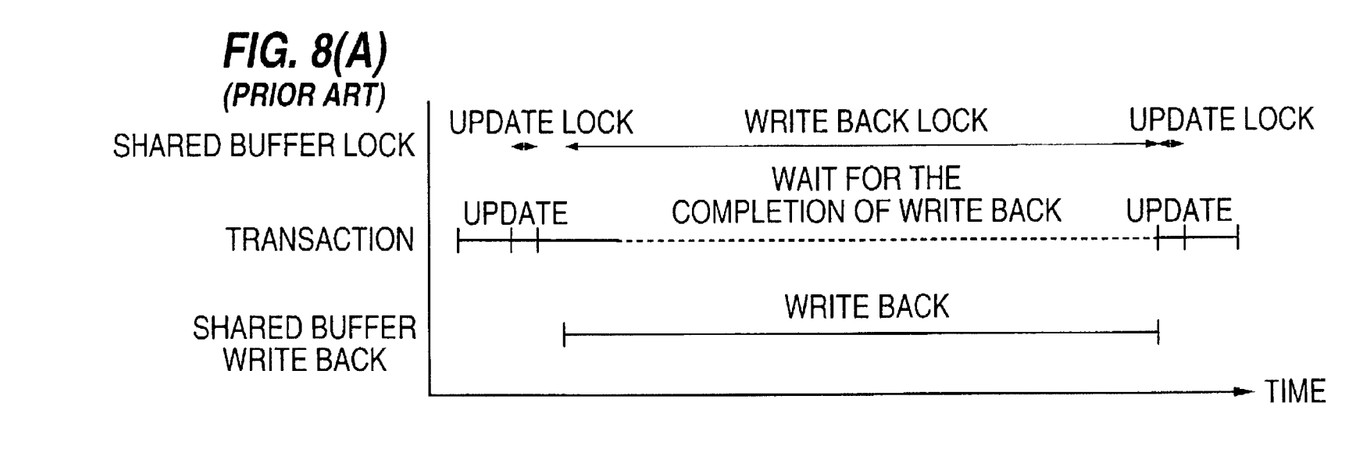
FIG. 8A and 8B illustrates a comparison of the effects of the present invention with those of the prior art.
Figure 8B:
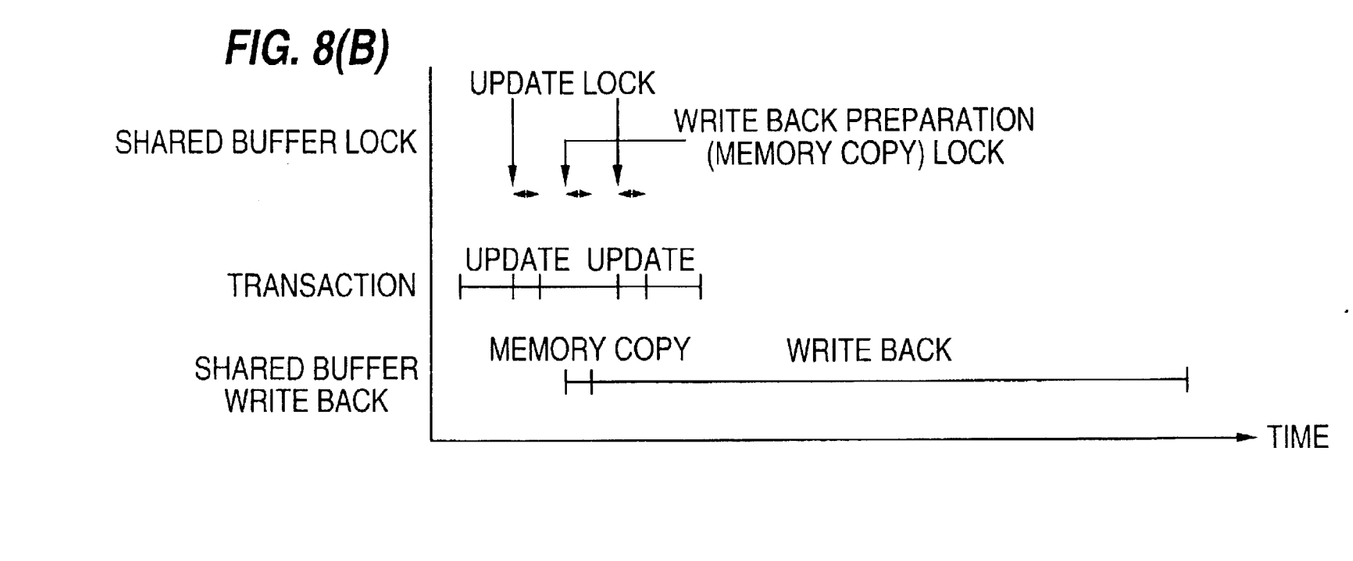

Referring now to FIG. 8(a) and 8(b) therein depicted are comparisons of the present invention with the prior art, in which FIG. 8A) shows the prior art and FIG. 8(b) shows the present invention. In FIG. 8(A), a shared buffer to be written back is locked for an entire write back period, which must be exclusive with respect to lock periods for updating. In particular, a transaction that updates the shared buffer is put in a wait state during the write back period of the buffer. This results in delaying a response time of the transaction.

In FIG. 8(b), and according to the present invention, the lock period of the buffer is equal to a memory copy period, which is a preparation period for the write back operation. During an actual write back operation, the buffer is unlocked, so that transactions that update the buffer are substantially not delayed.

As explained above, the present invention temporarily copies the contents of a buffer to be nonvolatilized into a temporary memory, and nonvolatilizes the copy. This shortens a lock period needed for nonvolatilizing the contents of the buffer and improves a response time of a transaction that updates the buffer. In addition, the present invention substantially eliminates the convoy phenomenon, to improve a throughout.

The present invention provides a method of and an apparatus for shortening a lock period of a shared buffer that is used when an application program lets a database management system access a database. Since the lock period is shortened, transactions that share the buffer will not be queued for long periods of time. This results in improving the throughput of a data processing system employing a computer. The present invention, therefore, is applicable for various industrial fields. For example, the present invention may be adapted to work in the field of the present on-line transaction processing systems that simultaneously handle more than 1000 processes. In such systems, a queue at a hot spot will immediately cause a convoy phenomenon. This resembles a traffic accident causing a traffic jam in big cities. The present invention greatly reduces a write back period to eliminate the convoy phenomenon, which may correspond to dealing with the traffic accident to clear the traffic jam, thereby improving not only a response time of transactions but also a throughput.

The present invention has been described hereinabove by way of example and with regard to the preferred embodiments depicted in the drawing figures. As such, it will be readily appreciated by those skilled in the art that many changes and modifications may be made in these embodiments, without departing from the principles and spirit of the present invention, the scope of which is defined in the appended claims and their equivalents.

We claim:

1. A method for writing contents of a shared buffer to a database in a nonvolatile memory of a data processing system executing a plurality of transactions accessing the database through said shared buffer, said method comprising the following steps:

(a) allocating a copy memory to be used when writing the contents of said shared buffer to the database;

(b) temporarily locking said shared buffer, after completion of said allocating in step (a);

(c) copying contents of said shared buffer into the copy memory;

(d) unlocking said shared buffer after completion of said copying in step (c); and (e) writing the contents of said copy memory into the database, concurrently with accessing of said shared buffer by the transactions.

2. The method according to claim 1, further comprising the step of determining whether said shared buffer will be updated, and wherein said writing in step includes writing the contents of said shared buffer into the database independently of said allocating of the copy memory in step (a) and independently of said copying of the contents of said shared buffer into the copy memory in step (c) when it is determined that said shared buffer will remain static.

3. The method according to claim 1, wherein said buffer is locked before the contents thereof are copied into the copy memory and is unlocked after completion of said copying in step (c), but before said writing in step (e).

4. A data processing system providing a database management system accessing and managing a database containing data, said data processing system comprising:

at least one buffer having contents and shared by transactions of the database management system;

a log buffer temporarily storing pre-update and post-update logs;

a log file storing said pre-update and post-update logs;

a copy memory temporarily storing the contents of said buffer;

a replacement controller copying the contents of said buffer into said copy memory;

a process selector determining whether said buffer will be update;

an exclusive controller controlling access to said buffer; and a log controller saving the pre-update and the post-update logs.

5. The data processing system according to claim 4, wherein when said process selector determines that said buffer will remain static, said replacement controller writes the contents of said buffer into the database independently of securing said copy memory and independently of copying the contents of said buffer into said copy memory.

6. The system according to claim 4, wherein said buffer is locked before the contents thereof are copied into said copy memory, and unlocked after completion of the copying by said replacement controller and before the writing of the contents of said copy memory.

7. A data processing system for a plurality of transactions accessing a database in a nonvolatile memory through a shared buffer, comprising:

a copy memory for temporarily storing the contents of said shared buffer;

a replacement controller for copying the contents of said shared buffer to said copy memory;

an exclusive controller for preventing said plurality of transactions from accessing said shared buffer while said replacement controller is copying the contents of said shared buffer to said copy memory; and write back means for writing back the contents of said copy memory to the database, concurrently with processing of the plurality of transactions accessing said shared buffer.

8. A data processing system for a plurality of transactions accessing a database in a nonvolatile memory through a shared buffer, comprising:

a copy memory for temporarily storing the contents of said shared buffer;

a replacement controller for copying the contents of said shared buffer to said copy memory;

a process selector for determining whether said shared buffer will be updated;

an exclusive controller for preventing the plurality of transactions from accessing said shared buffer while said replacement controller is copying the contents of said shared buffer, if said process selector determines that said shared buffer will be updated; and write back means for writing back the contents of said copy memory to the database, if said process selector determines that said shared buffer will be updated, and otherwise writing back the contents of said shared buffer to the database, concurrently with processing of the plurality of transactions accessing said shared buffer.

* * * * *

UNITED STATES PATENT AND TRADEMARK OFFICE
CERTIFICATE OF CORRECTION

PATENT NO.: 5,715,447
DATED : February 3, 1998
INVENTOR(S): Katzumi HAYASHI et al.

It is certified that error appears in the above-identified patent and that said Letters Patent is hereby corrected as shown below:

Col. 2, line 55, after "prior" insert --art;--.

Col. 11, line 49, after "step" insert --(e)--.

Signed and Sealed this

Fourteenth Day of September, 1999

Attest:

Q. TODD DICKINSON

*Attesting Officer*  *Acting Commissioner of Patents and Trademarks*